US008669319B2

(12) United States Patent
Dams et al.

(10) Patent No.: US 8,669,319 B2
(45) Date of Patent: Mar. 11, 2014

(54) CATIONIC POLYMERIC FLUORINATED ETHER SILANE COMPOSITIONS AND METHODS OF USE

(71) Applicant: 3M Innovative Properties Company, St. Paul, MN (US)

(72) Inventors: Rudolf J. Dams, Antwerp (BE); Suresh S. Iyer, Woodbury, MN (US); Chetan P. Jariwala, Woodbury, MN (US); Thomas P. Klun, Lakeland, MN (US); Inge Nuyts, Steendorp (BE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/709,951

(22) Filed: Dec. 10, 2012

(65) Prior Publication Data

US 2013/0102747 A1    Apr. 25, 2013

Related U.S. Application Data

(62) Division of application No. 12/745,682, filed as application No. PCT/US2008/084953 on Nov. 26, 2008, now Pat. No. 8,357,751.

(60) Provisional application No. 60/991,811, filed on Dec. 3, 2007.

(51) Int. Cl.
   *C08L 27/12*     (2006.01)
   *C08L 31/00*     (2006.01)
   *C08F 214/18*    (2006.01)
   *C08F 16/24*     (2006.01)
   *B32B 27/06*     (2006.01)

(52) U.S. Cl.
   USPC ........... 524/544; 524/556; 526/243; 526/247; 526/222; 526/194; 428/421

(58) Field of Classification Search
   USPC ............ 524/544, 556; 526/243, 247, 22, 194; 428/421
   See application file for complete search history.

(56) References Cited

U.S. PATENT DOCUMENTS

| | | | |
|---|---|---|---|
| 3,012,006 A | 12/1961 | Holbrook et al. |
| 3,250,807 A | 5/1966 | Fritz et al. |
| 3,250,808 A | 5/1966 | Moore, Jr. et al. |
| 3,450,738 A | 6/1969 | Blochl |
| 3,700,844 A | 10/1972 | Domba |
| 3,810,874 A | 5/1974 | Mitsch et al. |
| 3,810,875 A | 5/1974 | Rice et al. |
| 3,817,739 A | 6/1974 | Abbott et al. |
| 3,882,193 A | 5/1975 | Rice et al. |
| 4,005,024 A | 1/1977 | Rodriguez et al. |
| 4,321,404 A | 3/1982 | Williams et al. |
| 4,417,066 A | 11/1983 | Westall |
| 4,467,013 A | 8/1984 | Baldwin |
| 4,645,813 A * | 2/1987 | Fong .............................. 526/247 |
| 5,086,123 A | 2/1992 | Guenthner et al. |
| 5,145,596 A | 9/1992 | Blank et al. |
| 5,523,441 A | 6/1996 | Kishita |
| 5,674,961 A | 10/1997 | Fitzgerald |
| 5,739,369 A | 4/1998 | Matsumura et al. |
| 5,753,569 A | 5/1998 | Michels et al. |
| 5,798,415 A | 8/1998 | Corpart et al. |
| 5,919,527 A | 7/1999 | Fitzgerald et al. |
| 5,959,014 A | 9/1999 | Liebeskind et al. |
| 6,037,429 A | 3/2000 | Linert et al. |
| 6,111,043 A | 8/2000 | Corpart et al. |
| 6,113,978 A | 9/2000 | Ornstein et al. |
| 6,197,382 B1 | 3/2001 | Ornstein et al. |
| 6,200,684 B1 | 3/2001 | Yamaguchi et al. |
| 6,271,289 B1 | 8/2001 | Longoria et al. |
| 6,303,190 B1 | 10/2001 | Linert et al. |
| 6,326,447 B1 | 12/2001 | Fitzgerald |
| 6,383,569 B2 | 5/2002 | Ornstein et al. |
| 6,518,380 B2 | 2/2003 | Juhue et al. |
| 6,540,866 B1 | 4/2003 | Zhang et al. |
| 6,613,860 B1 | 9/2003 | Dams et al. |
| 6,632,805 B1 | 10/2003 | Liebeskind et al. |
| 6,649,272 B2 | 11/2003 | Moore et al. |
| 6,923,921 B2 | 8/2005 | Flynn et al. |
| 7,097,910 B2 | 8/2006 | Moore et al. |
| 2001/0020077 A1 | 9/2001 | Juhue et al. |

(Continued)

FOREIGN PATENT DOCUMENTS

| | | |
|---|---|---|
| EP | 1 225 187 A1 | 7/2002 |
| JP | 06239941 A * | 8/1994 |
| WO | WO 97/42200 | 11/1997 |
| WO | WO 99/03866 | 1/1999 |
| WO | WO 01/30873 A1 | 5/2001 |
| WO | WO 03/018508 A1 | 3/2003 |

OTHER PUBLICATIONS

AATCC Test Method 22-2001, "Water Repellency: Spray Test", (2002), pp. 65-67, AATCC Technical Manual.

AATCC Test Method 118-1983, "Oil Repellency: Hydrocarbon Resistance Test", 1 page, AATCC Technical Manual.

Shao, Hui et al., "Synthesis and Surface Antimicrobial Activity of a Novel Perfluorooctylated Quaternary Ammonium Silane Coupling Agent", Journal of Fluorine Chemistry, 2004, pp. 721-724, vol. 125, Elsevier B.V.

*Primary Examiner* — Michael Bernshteyn
(74) *Attorney, Agent, or Firm* — Robert W. Sprague

(57) ABSTRACT

A polymer is provided comprising a first pendant group selected from at least one of a perfluorinated ether group or a perfluoroalkanesulfonamido group, a second pendant group comprising an ammonium group, wherein the second pendant group is free of silicon, and a third pendant group comprising an ammonium group and a reactive silicon-containing group. A composition comprising the polymer is provided. The polymer and composition are useful for protecting a substrate, for example, to render the substrate oil repellent, water repellent, or both, or to provide stain repellency to the substrate.

6 Claims, No Drawings

(56) References Cited

U.S. PATENT DOCUMENTS

| | | |
|---|---|---|
| 2002/0071959 A1 | 6/2002 | Yamaguchi et al. |
| 2002/0090515 A1 | 7/2002 | Pellerite et al. |
| 2002/0096286 A1 | 7/2002 | Kantamneni et al. |
| 2002/0192380 A1 | 12/2002 | Elsbernd et al. |
| 2003/0168783 A1 | 9/2003 | Dams |
| 2003/0224112 A1 | 12/2003 | Dams |
| 2004/0044139 A1 | 3/2004 | Grootaert et al. |
| 2004/0077758 A1 | 4/2004 | Juhue et al. |
| 2004/0077775 A1 | 4/2004 | Audenaert et al. |
| 2005/0136264 A1* | 6/2005 | Dams et al. ............ 428/429 |
| 2010/0219367 A1 | 9/2010 | Dams et al. |
| 2010/0221967 A1 | 9/2010 | Iyer et al. |
| 2011/0045270 A1 | 2/2011 | Dams et al. |

* cited by examiner

CATIONIC POLYMERIC FLUORINATED ETHER SILANE COMPOSITIONS AND METHODS OF USE

TECHNICAL FIELD

The present invention relates to cationic polymeric fluorinated ether silane compositions and methods of using these compositions.

BACKGROUND

Some fluorinated compounds can impart water and oil resistance to substrates such as, for example, textiles, paper, non-woven materials, leather, and masonry. Water and oil resistance has been achieved by applying a composition comprising a fluorinated compound to, for example, the surface of a substrate. Fluorinated compounds that have been shown to impart water and oil resistance to substrates include some polymeric fluorinated compounds, i.e., fluorinated polymers. Fluorinated polymers include polymers having fluorinated groups pendant to a polymer chain, for example, fluorinated (meth)acrylate polymers and fluorinated urethane polymers.

In many cases, the fluorinated compounds have been applied to the surface of a substrate in a composition comprising a substantial amount of an organic solvent. In some cases, the organic solvent has comprised chlorine- and/or fluorine-containing compounds such as tetrachloroethylene or trichlorotrifluoroethane. Methods to apply a solution of a fluorinated compound have included spraying the solution from a pressurized container such as an aerosol can.

SUMMARY

There is a need for compositions comprising fluorinated polymeric compounds, particularly cationic polymeric fluorinated compounds, that comprise or can be delivered from aqueous or substantially aqueous media and that can impart water and oil resistance to substrates and, more particularly, to surfaces of substrates.

In one aspect, a polymer is provided that comprises a first pendant group selected from at least one perfluorinated ether group or perfluoroalkanesulfonamido group, a second pendant group comprising an ammonium group, where the second pendant group is free of silicon, and a third pendant group comprising an ammonium group and a reactive silicon-containing group.

In another aspect, a polymer is provided, the polymer prepared from reactants comprising a first monomer having the structure of Formula I

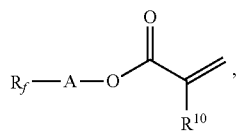
(I)

a second monomer having the structure of Formula II

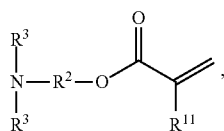
(II)

a first quaternizing agent comprising at least one acid or silicon-free alkylating agent, and a second quaternizing agent comprising the structure of Formula III $$X-R^6-Si(R^7)_3. \quad (III)$$

In Formula I, $R_f$ is selected from a structure of Formula IV $$F(C_mF_{2m}O)_nC_pF_{2p}-, \quad (IV)$$

where m is an integer of 1 to 12, n is an integer of 1 to 20 and p is an integer off 1 to 6, a structure of Formula V $$C_xF_{2x+1}SO_2N(R^1)-, \quad (V)$$

(where x is an integer of 1 to 6 and $R^1$ is a hydrogen atom, an alkyl group, an aryl group, or an aralkyl group), and combinations thereof. In Formula I, group A is a linking group having less than 11 carbon atoms, and $R^{10}$ is a hydrogen atom or an alkyl group having 1 to 4 carbon atoms. In Formula II, $R^2$ comprises at least one of an alkylene group, a heteroalkylene group, an arylene group, or an aralkylene group, each $R^3$ is independently a hydrogen atom or an alkyl group, and $R^{11}$ is a hydrogen atom or an alkyl group having 1 to 4 carbon atoms. In Formula III, X is a leaving group selected from halo, alkyl sulfonate, fluorinated alkyl sulfonate, aryl sulfonate, and fluorinated aryl sulfonate, $R^6$ is an alkylene group having less than 11 carbon atoms, and each $R^7$ is independently a hydroxy group, an alkoxy group, an acyl group, an acyloxy group, a halo group, an ether group or a polyether group.

In another aspect, a composition is provided that comprises a) a polymer comprising a first pendant group selected from at least one perfluorinated ether group or perfluoroalkanesulfonamido group, a second pendant group comprising an ammonium group, wherein the second pendant group is free of silicon, and a third pendant group comprising an ammonium group and a reactive silicon-containing group, and b) at least one water-soluble organic solvent or water.

In yet another aspect, a method of protecting a substrate is provided, the method comprising providing a composition comprising a polymer and at least one water-soluble organic solvent or water, and contacting the substrate with the composition. The polymer has a first pendant group selected from at least one perfluorinated ether group or perfluoroalkanesulfonamido group, a second pendant group comprising an ammonium group, wherein the second pendant group is free of silicon, and a third pendant group comprising an ammonium group and a reactive silicon-containing group.

In yet another aspect, an article is provided comprising a substrate and a polymer, wherein the polymer is in contact with at least a portion of a surface of the substrate, the polymer comprising a first pendant group selected from at least one perfluorinated ether group or perfluoroalkanesulfonamido group, a second pendant group comprising an ammonium group, wherein the second pendant group is free of silicon, and a third pendant group comprising an ammonium group and a reactive silicon-containing group.

This summary is not intended to describe each and every embodiment or implementation of the present invention. Further embodiments, features, and advantages of the present invention will be apparent from the following detailed description thereof and from the claims.

DETAILED DESCRIPTION

In several places throughout the application, guidance is provided through lists of examples, which examples can be used in various combinations. In each instance, the recited list serves only as a representative group and should not be interpreted as an exclusive list.

Any recitation of numerical ranges by endpoints includes all numbers subsumed within that range (e.g., 1 to 5 includes 1, 1.5, 2, 2.75, 3, 3.80, 4, 5, etc.);

The terms "a," "an," "the," "at least one," and "one or more" are used interchangeably. Thus, for example, a composition that comprises "a" monomer of Formula I can be interpreted to mean that the composition includes "one or more" monomers of Formula I.

The term "(meth)acrylate" refers to either an acrylic acid ester, a methacrylic acid ester, or a combination of an acrylic acid ester and a methacrylic acid ester.

The term "ammonium group" refers to a group comprising a quaternary nitrogen atom (including a group having four single bonds to a nitrogen atom).

The term "reactive silicon-containing group" refers to a group comprising at least one silicon atom bonded to at least one of a hydroxy group or group bonded to the silicon atom by a bond that is hydrolyzable.

The term "quaternizing agent" refers to a compound or composition capable of reacting with an amine group to form an ammonium group.

The term "silicon-free alkylating agent" refers to a compound or composition, free of silicon, capable of reacting with an amine group to form a new chemical bond between the amine nitrogen atom and a carbon atom in the alkylating agent.

A polymer is provided that comprises a first pendant group selected from at least one perfluorinated ether group or perfluoroalkanesulfonamido group, a second pendant group comprising an ammonium group, where the second pendant group is free of silicon, and a third pendant group comprising an ammonium group and a reactive silicon-containing group.

The first pendant group is selected from at least one perfluorinated ether group or perfluoroalkanesulfonamido group. The perfluorinated ether group comprises at least one oxygen atom. The perfluorinated ether group can be a linear perfluorinated ether group, or it can comprise branched or cyclic structures. An oxygen atom in the perfluorinated ether group can be in one or more of a linear, branched, or cyclic structure. The perfluorinated ether group can have a weight average molecular weight (in units of grams per mole) of at least 200, at least 300, at least 400, at least 500, at least 600, at least 700, at least 800 at least 900, at least 1000, at least 1250, at least 1500, at least 1750, at least 2000, at least 2250, at least 2500, at least 2750, at least 3000, at least 3250, at least 3500, at least 3750, at least 4000, at least 4500, at least 5000, at least 5500, or at least 6000. The perfluorinated ether group can have a weight average molecular weight of not greater than 6000, not greater than 5500, not greater than 5000, not greater than 4500 not greater than 4000, not greater than 3500, not greater than 3000, not greater than 2750, not greater than 2500, not greater than 2250, not greater than 2000, not greater than 1750, not greater than 1500, not greater than 1250, not greater than 1000, not greater than 900, not greater than 800, not greater than 700, not greater than 600, not greater than 500, not greater than 400, not greater than 300, or not greater than 200. The perfluorinated ether group can have a weight average molecular weight of 200 to 6000, 300 to 6000, 300 to 5000, 500 to 5000, 750 to 5000, 750 to 4500, 1000 to 4500, 1250 to 4500, 1250 to 4000, 1250 to 3750, 1250 to 3500, 1250 to 3250, 1250 to 3200, or 1250 to 3000.

The perfluorinated ether group can comprise a perfluoroalkyl group, a perfluoroalkylene group, or both. The perfluoroalkyl group can comprise one or more of a linear, branched, or cyclic structure. Non limiting examples of perfluoroalkyl groups include perfluoromethyl, perfluoroethyl, perfluoropropyl, perfluorobutyl, perfluoro-2-butyl, perfluorohexyl, perfluorocyclohexyl, and perfluorocyclohexylmethyl groups. The perfluoroalkylene group can comprise one or more of a linear, branched, or cyclic structure. Non limiting examples of perfluoroalkylene groups include perfluoromethylene, perfluoroethylene, and perfluoro-1,2-propylene.

The perfluorinated ether group can be derived from, for example, tetrafluoroethylene or hexafluoropropylene, as described in, for example, U.S. Pat. No. 3,882,193 (Rice et al.) and U.S. Pat. No. 3,250,807 (Fritz et al.). The perfluorinated ether group can be derived from, for example, hexafluoropropylene oxide, as described in, for example, U.S. Pat. No. 6,923,921 (Flynn et al.) and U.S. Pat. No. 3,250,808 (Moore, Jr. et al.).

In some embodiments, the perfluorinated ether group is a perfluoropolyether group. The perfluoropolyether group comprises at least two oxygen atoms, and can comprise more than two oxygen atoms.

The perfluorinated ether group can comprise a structure of Formula IV $$F(C_mF_{2m}O)_nC_pF_{2p}\text{—}, \quad (IV)$$

wherein m is an integer of 1 to 12, n is an integer of 1 to 40, and p is an integer of 1 to 6. In some embodiments, m is an integer of at least 1, at least 2, at least 3, at least 4, at least 5, at least 6, at least 7, at least 8, at least 9, at least 10, or at least 11. In some embodiments, m is an integer of 12, less than 12, less than 11, less than 10, less than 9, less than 8, less than 7, less than 6, less than 5, less than 4, less than 3, or less than 2. In some embodiments, n is an integer of at least 1, at least 2, at least 4, at least 6, at least 8, at least 10, at least 12, at least 14, at least 16, at least 18, at least 20, at least 22, at least 24, at least 26, at least 28, at least 30, at least 32, at least 34, at least 36, or at least 38. In some embodiments, n is an integer of 40, less than 40, less than 38, less than 36, less than 34, less than 32, less than 30, less than 28, less than 26, less than 24, less than 22, less than 20, less than 18, less than 16, less than 14, less than 12, less than 10, less than 8, less than 6, less than 4, or less than 2. In some embodiments, p is an integer of 1, 2, 3, 4, 5, or 6. The substructures $C_mF_{2m}$ and $C_pF_{2p}$ can independently comprise one or more of a linear, branched, or cyclic structure. The preparation of perfluorinated ethers comprising such structures can result in a mixture of perfluorinated ethers, each comprising structures having different integer values of m, n, and p. Such mixtures of perfluorinated ethers can have non-integer average values of m, n, and p.

The perfluorinated ether group of Formula IV can comprise a structure of Formula VI $$F(CF(CF_3)CF_2O)_nCF(CF_3)\text{—}, \quad VI$$

wherein n is as defined above. The preparation of perfluorinated ethers of Formula VI can result in a mixture of perfluorinated ethers, each comprising structures having different integer values of n. Such mixtures of perfluorinated ethers can have non-integer average values of n.

The perfluoroalkanesulfonamido group has the structure of Formula V $$C_xF_{2x+1}SO_2N(R^1)\text{—} \quad (V)$$

wherein x is an integer of 1 to 6 and $R^1$ is selected from a hydrogen atom, an alkyl group, an aryl group, and an aralkyl group. In Formula V, x can be an integer of 1, 2, 3, 4, 5, or 6. In Formula V, $R^1$ can be, for example, a methyl group, an ethyl group, a propyl group, a butyl group, a phenyl group, or a benzyl group. The preparation of perfluoroalkanesulfonamido compounds comprising such structures can result in a mixture of compounds comprising a perfluoroalkanesulfonamido group, each comprising structures having different integer values of x. Such mixtures of compounds each comprising a perfluoroalkanesulfonamido group can have non-integer average values of x.

When R¹ in Formula V is an alkyl group, the alkyl group can be a linear, branched, or cyclic alkyl group. The alkyl group can comprise linear, branched, or cyclic structures. The alkyl group can comprise up to 20, up to 18, up to 16, up to 14, up to 12, up to 10, up to 8, up to 6, up to 4, up to 2 carbon atoms, or 1 carbon atom. The alkyl group can comprise less than 20, less than 18, less than 16, less than 14, less than 12, less than 10, less than 8, less than 6, less than 4, or less than 2 carbon atoms. Non-limiting examples of alkyl groups include methyl, ethyl, propyl, butyl, hexyl, octyl, decyl, 2-propyl, 2-butyl, 2-hexyl, cyclohexyl, and cyclohexylmethyl. In some embodiments, R¹ is a methyl group. In other embodiments, R¹ is an ethyl group.

When R¹ in Formula V is an aryl group, the aryl group can comprise one arene ring or more than one arene ring. Aryl groups can comprise up to 6 carbon atoms, up to 8 carbon atoms, up to 10 carbon atoms, up to 12 carbon atoms, up to 14 carbon atoms, up to 16 carbon atoms, or up to 18 carbon atoms. In some embodiments, aryl groups can comprise a heteroarene ring (i.e., an arene ring comprising a heteroatom, for example, nitrogen, oxygen, or sulfur). If more than one arene ring is present in an aryl group, the arene rings (which can be the same or different) can be fused together, or they can be joined by a chemical bond. Non-limiting examples of aryl groups include substituted and unsubstituted phenyl, 1-naphthyl, 2-naphthyl, 9-anthracenyl, and biphenyl. In some embodiments, R¹ is a phenyl group.

When R¹ in Formula V is an aralkyl group, the aralkyl group can comprise one arene ring or more than one arene ring. The aralkyl group can comprise up to 6 carbon atoms, up to 8 carbon atoms, up to 10 carbon atoms, up to 12 carbon atoms, up to 14 carbon atoms, up to 16 carbon atoms, up to 18 carbon atoms, or up to 20 carbon atoms. If more than one arene ring is present in the aralkyl group, the arene rings (which can be the same or different) can be fused together, or they can be joined by a chemical bond. In some embodiments, aralkyl groups can comprise a heteroaralkyl group, i.e., comprising a heteroarene ring. The aralkyl group comprises one or more alkyl groups. The alkyl groups can be bonded to an arene ring, and can comprise 1, 2, 3, 4, 5, 6, or more than 6 carbon atoms. Examples of alkyl groups include methyl, ethyl, 1-propyl, 2-propyl, 1-butyl, and 2-butyl groups. Non-limiting examples of aralkyl groups include benzyl, 4-methyl benzyl, 1-phenylethyl, 2-phenylethyl, 3-phenylpropyl, 2-naphthylethyl, and 9-anthracenylmethyl.

Useful perfluoroalkanesulfonamido groups include, but are not limited to, perfluorobutanesulfonamido groups having the Formulas $C_4F_9SO_2N(CH_3)$—, $C_4F_9SO_2N(CH_2CH_3)$—, $C_4F_9SO_2N(CH_2CH_2CH_3)$—, and $C_4F_9SO_2N(CH_2CH_2CH_2CH_3)$—.

The second pendant group comprises an ammonium group and is free of silicon. The ammonium group comprises the structure of Formula VII

(VII)

wherein R² comprises at least one of an alkylene group, a heteroalkylene group, an arylene group, or an aralkylene group, and each R³ is independently a hydrogen atom or an alkyl group.

In some embodiments, R² comprises an alkylene group. The alkylene group can comprise one or more of a linear, branched, or cyclic structure. In some embodiments, R² comprises a heteroalkylene group, i.e., an alkylene group that comprises at least one heteroatom, e.g., oxygen, nitrogen, or sulfur. The alkylene or heteroalkylene group can comprise at least 1 carbon atom, or up to 2, up to 3, up to 4, up to 5, up to 6, up to 7, up to 8, up to 9, up to 10, up to 14, up to 16, up to 18, or up to 20 carbon atoms. The alkylene or heteroalkylene group can comprise less than 20, less than 18, less than 16, less than 14, less than 12, less than 10, less than 8, less than 6, less than 4, or less than 2 carbon atoms. Non-limiting examples of alkylene groups include methylene, ethylene, 1,3-propylene, 1,2-propylene, 1,4-butylene, 1,4-cyclohexylene, and 1,4-cyclohexyldimethylene.

In some embodiments, R² comprises an arylene group. The arylene group comprises one or more arene rings. When the arylene group comprises more than one arene ring, the arene rings (which can be the same or different) can be fused, joined by a covalent bond, or joined via, for example, a joining group such as an alkylene group or a heteroatom such as oxygen. In some embodiments, the arylene group comprises at least one heteroarene ring. The arylene group can comprise at least 4 carbon atoms, or at least 5, at least 6, at least 10, or at least 14 carbon atoms. Non-limiting examples of arylene groups include phenyl, 1-naphthyl, 2-naphthyl, 9-anthracenyl, furanyl, and thiophenyl.

In some embodiments, R² comprises an aralkylene group. The aralkylene group can comprise one or more arene rings. When the aralkylene group comprises more than one arene ring, the arene rings (which can be the same or different) can be fused, joined by a covalent bond, or joined via, for example, a joining group such as an alkylene group or a heteroatom such as oxygen. The aralkylene group can comprise at least one heteroatom, e.g., oxygen, nitrogen, or sulfur. The aralkylene group can comprise at least about 4 carbon atoms, or at least about 5, at least about 6, at least about 10, or at least about 14 carbon atoms.

Each R³ is independently a hydrogen atom or an alkyl group. Typically, at least one R³ is an alkyl group, and more typically, more than one R³ are independently alkyl groups. When more than one R³ are independently alkyl groups, the alkyl groups can be the same or different. The alkyl group can comprise 1 carbon atom, more than 1 carbon atom, more than 2 carbon atoms, more than 4 carbons atoms, more than 6 carbon atoms, more than 8 carbon atoms, more than 10 carbon atoms, more than 12, more than 14, more than 16 carbon atoms, or more than 20 carbon atoms. The alkyl group can comprise 20, less than 20, less than 18, less than 16, less than 14, less than 12, less than 10, less than 8, less than 6, less than 4, or less than 2 carbon atoms. In some embodiments, the alkyl group comprises 1 to 8 carbon atoms. In some embodiments, the alkyl group comprises a straight chain alkyl group. In other embodiments, the alkyl group comprises a branched alkyl group. In still other embodiments, the alkyl group comprises a cyclic alkyl group. Non-limiting examples of alkyl groups include methyl, ethyl, 1-propyl, iso-propyl, butyl, isobutyl, sec-butyl, pentyl, iso-pentyl, neo-pentyl, hexyl, 2-ethylhexyl, octyl, decyl, undecyl, dodecyl, tetradecyl, pentadecyl, octadecyl, cyclohexyl, 4-methylcyclohexyl, cyclohexylmethyl, cyclopenyl, and cyclooctyl.

In some embodiments, R² comprises an alkylene group having from 1 to 6 carbon atoms and each R³ is independently a hydrogen atom or an alkyl group having from 1 to 4 carbon atoms. In some embodiments, R² comprises an alkylene group having 2 carbon atoms, and more than one R³ are methyl groups.

The third pendant group comprises an ammonium group and a reactive silicon-containing group. In some embodiments, the third pendant group comprises the structure of Formula VIII

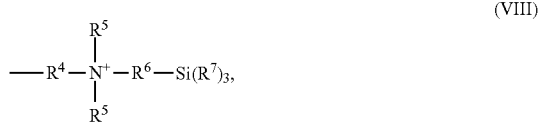

where $R^4$ and $R^6$ independently comprise alkylene groups, arylene groups, or combinations thereof, each $R^5$ is independently an alkyl group, and each $R^7$ is independently a hydroxy group or a group bonded to the silicon atom via a hydrolyzable bond. In this context, "bonded to the silicon atom via a hydrolyzable bond" refers to the reactivity of the $R^7$-silicon bond with water (i.e., to a bond that is capable of undergoing a hydrolysis reaction). In some embodiments, $R^7$ is bonded to the silicon atom via a bond including a carbon atom (i.e., $R^7$ comprises a carbon atom bonded to the silicon atom). In some embodiments, $R^7$ is bonded to the silicon atom via a bond including an atom other than a carbon atom. In some embodiments, $R^7$ is bonded to the silicon atom via a bond including, for example, a nitrogen, oxygen, or sulfur atom (i.e., $R^7$ comprises a nitrogen, oxygen, or sulfur atom, respectively, bonded to the silicon atom).

Each $R^7$ can independently be a non-ionic group or an ionic group. The ionic group can be cationic, anionic, or zwitterionic. Non-limiting examples of a non-ionic group include hydroxy, alkoxy, acyl, acyloxy, halo, ether, and polyether groups. Alkoxy groups include, for example, methoxy and ethoxy groups. Halo groups include, for example, chloro, bromo, and iodo groups. Acyl groups include, for example, acetyl, propionyl, and benzoyl groups. Acyloxy groups include, for example, acetoxy and propionoxy groups. Ether and polyether groups can comprise oxyalkylene groups, for example groups having the structure of Formula IX

where v is an integer of 1 to 10 and w is an integer of 1 to 200. An ether group can include a group of Formula IX where w is 1. Non-limiting examples of polyether groups comprising oxyalkylene groups include poly(oxymethylene), poly(oxyethylene), and poly(oxybutylene) groups. In Formula IX, w can be an integer of at least 1, at least 2, at least 4, at least 6, at least 8, at least 10, at least 20, at least 30, at least 40, at least 50, at least 60, at least 80, at least 100, at least 150, or at least 190. In Formula IX, w can be an integer of less than 200, less than 180, less than 160, less than 150, less than 140, less than 120, less than 100, less than 80, less than 60, less than 40, less than 20, less than 15, less than 10, less than 8, less than 6, less than 4, or less than 2. When $R^7$ is an ionic group, it can be a cationic group, e.g., it can comprise a cationic nitrogen atom. Non-limiting examples of ionic groups include groups such as —OCH$_2$CH$_2$N$^+$(CH$_3$)$_3$I$^-$, —OCH$_2$CH$_2$N$^+$ Cl$^-$, and —OCH$_2$CH$_2$N$^+$(CH$_3$)$_2$CH$_2$CH$_2$CH$_2$SO$_3^-$. In some embodiments, polyether groups comprising more than one oxyalkylene group further comprises a cationic group (e.g., a group comprising a cationic nitrogen atom), an anionic group, or both a cationic group and an anionic group.

The alkylene group of Formula IX (i.e., the group having the substructure $C_vH_{2v}$) can independently comprise one or more of a linear, a branched, or a cyclic structure. In Formula IX, v can be 1, 2, 3, 4, 5, 6, 7, 8, 9, or 10. Non-limiting examples of alkylene groups include methylene, ethylene, 1,3-propylene, 1,2-propylene, 1,4-butylene, 1,4-cyclhexylene, and 1,4-cyclohexyldimethylene.

In some embodiments, $R^4$ and $R^6$ independently comprise alkylene groups having from 1 to 6 carbon atoms, each $R^5$ is independently an alkyl group having from 1 to 4 carbon atoms, and each $R^7$ is independently a hydroxy group, an alkoxy group, an acyl group, an acyloxy group, a halo group, an ether group, or a polyether group. In some embodiments, each $R^7$ is independently a hydroxy group, a methoxy group, or an ethoxy group.

The polymer can further comprise a fourth pendant group. The fourth pendant group comprises a nonionic non-fluorinated group. Examples of nonionic non-fluorinated groups include unsubstituted and substituted alkyl groups having one or more of a linear, branched, or cyclic structure, and aryl groups. The alkyl groups can be substituted with, for example, halogen (other than fluorine) or the alkyl groups can contain, for example, an oxygen atom. Non-limiting examples of alkyl groups include methyl, ethyl, propyl, butyl, hexyl, octyl, decyl, dodecyl, 2-propyl, 2-butyl, 2-hexyl, 2-octyl, 3-octyl, 4-octyl, 2-ethylhexyl, 2-decyl, 4-decyl, 2-dodecyl, 3-dodecyl, cyclohexyl, cyclohexylmethyl, isobornyl, and cyclooctyl groups. The aryl groups include groups comprising at least one arene ring, e.g., unsubstituted and substituted arene rings. Non-limiting examples of such aryl groups include phenyl, 2-methylphenyl, 4-methylphenyl, 2,4,6-trimethylphenyl, benzyl, 4-methylbenzyl, 1-naphthyl, and 2-naphthyl.

The polymer can be, for example, a vinyl ether polymer, a vinyl ester polymer, a (meth)acrylamide polymer, or a (meth)acrylate polymer. Typically, the polymer is a (meth)acrylate polymer comprising a first pendant group selected from at least one perfluorinated ether group or perfluoroalkanesulfonamido group, a second pendant group comprising an ammonium group, where the second pendant group is free of silicon, and a third pendant group comprising an ammonium group and a reactive silicon-containing group.

A polymer is provided, prepared from reactants comprising a first monomer having the structure of Formula I

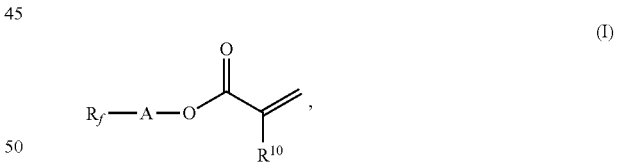

a second monomer having the structure of Formula II

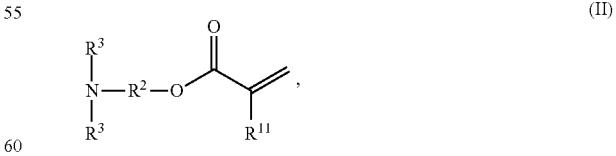

a first quaternizing agent comprising at least one of an acid or a silicon-free alkylating agent, and a second quaternizing agent comprising the structure of Formula III

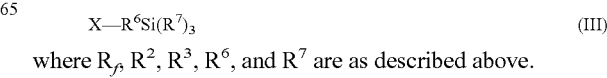

where $R_f$, $R^2$, $R^3$, $R^6$, and $R^7$ are as described above.

In Formula I, the group A is a linking group having less than 11 carbon atoms. The linking group A can have 10 carbon atoms, 9 carbon atoms, 8 carbon atoms, 7 carbon atoms, 6 carbon atoms, 5 carbon atoms, 4 carbon atoms, 3 carbon atoms, 2 carbon atoms, or 1 carbon atom. Linking group A can comprise an alkylene group (e.g., an ethylene, propylene, or butylene group), an arylene group (e.g., a phenylene group), or both.

The groups $R^{10}$ and $R^{11}$ are independently a hydrogen atom or an alkyl group having 1 to 4 carbon atoms.

In Formula III, the group X is a leaving group. The group X can be a group such as the conjugate base of a strong acid, for example selected from halo, alkyl sulfonate, fluorinated alkyl sulfonate, aryl sulfonate, and fluorinated aryl sulfonate.

In some embodiments, the polymer is substantially free of amino groups (i.e., substantially free of primary, secondary, or tertiary amino groups). The term "substantially free of primary, secondary, or tertiary amino groups" means that the polymer comprises less than 5 mole percent, less than 4 mole percent, less than 3 mole percent, less than 2 mole percent, less than 1 mole percent, less than 0.5 mole percent, less than 0.25 mole percent, less than 0.15 mole percent, less than 0.1 mole percent, less than 0.075 mole percent, less than 0.05 mole percent, less than 0.025 mole percent, less than 0.02 mole percent, less than 0.015 mole percent, less than 0.01 mole percent, less than 0.0075 mole percent, less than 0.005 mole percent, less than 0.0025 mole percent, less than 0.002 mole percent, less than 0.0015 mole percent, less than 0.001 mole percent, less than 0.00075 mole percent, less than 0.0005 mole percent, less than 0.00025 mole percent, less than 0.0002 mole percent, less than 0.00015 mole percent, less than 0.0001 mole percent, less than 0.000075 mole percent, less than 0.00005 mole percent, less than 0.000025 mole percent, less than 0.00002 mole percent, less than 0.000015 mole percent, or less than less than 0.00001 mole percent primary, secondary, or tertiary amino groups. In some embodiments, the polymer is free of primary, secondary, or tertiary amino groups.

In some embodiments, the first quaternizing agent comprises an acid. The acid can be an inorganic acid (e.g., a mineral acid) or an organic acid, or a mixture of an inorganic acid and an organic acid. Examples of useful acids include hydrochloric acid, hydrobromic acid, nitric acid, formic acid, acetic acid, propionic acid, maleic acid, fumaric acid, and benzoic acid.

In some embodiments, the first quaternizing agent comprises a silicon-free alkylating agent. The silicon-free alkylating agent can be any silicon-free alkylating agent, i.e., any agent capable of reacting with an amino group to produce an alkylated amino group. Classes of silicon-free alkylating agents include, for example, alkyl halides and aralkyl halides. Examples of useful silicon-free alkylating agents include methyl iodide, ethyl chloride, butyl bromide, and benzyl bromide.

In some embodiments, the second quaternizing agent comprises the structure of Formula III wherein X is a chloro group, $R^6$ is an alkylene group selected from ethylene, propylene, or butylene, and $R^7$ is selected from hydroxy, methoxy, or ethoxy.

The relative percentages of first and second quaternizing agents can vary over a wide range. Of the total of the first and second quaternizing agents, the first quaternizing agent can comprise at least 0.01 mole percent, at least 0.05 mole percent, at least 0.1 mole percent, at least 0.2 mole percent, at least 0.5 mole percent, at least 1 mole percent, at least 2 mole percent, at least 5 mole percent, at least 10 mole percent, at least 20 mole percent, at least 30 mole percent, at least 40 mole percent, at least 50 mole percent, at least 60 mole percent, at least 70 mole percent, at least 80 mole percent, at least 90 mole percent, at least 95 mole percent, at least 98 mole percent, at least 99 mole percent, at least 99.5 mole percent, at least 99.9 mole percent, or at least 99.99 mole percent. Of the total of the first and second quaternizing agents, the first quaternizing agent can comprise less than 0.01 mole percent, less than 0.05 mole percent, less than 0.1 mole percent, less than 0.2 mole percent, less than 0.5 mole percent, less than 1 mole percent, less than 2 mole percent, less than 5 mole percent, less than 10 mole percent, less than 20 mole percent, less than 30 mole percent, less than 40 mole percent, less than 50 mole percent, less than 60 mole percent, less than 70 mole percent, less than 80 mole percent, less than 90 mole percent, less than 95 mole percent, less than 98 mole percent, less than 99 mole percent, less than 99.5 mole percent, or less than 99.9 mole percent.

In addition to the monomers of Formula I and Formula II, as described above, the polymer can be prepared from reactants further comprising a third monomer of Formula X

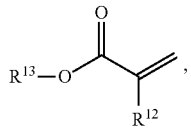

(X)

wherein $R^{12}$ is a hydrogen atom or an alkyl group having 1 to 4 carbon atoms, and $R^{13}$ is a nonionic, non-fluorinated group. In some embodiments, $R^{12}$ is a hydrogen atom or a methyl group, and $R^{13}$ is an unsubstituted or substituted alkyl group or an unsubstituted or substituted aryl group.

Typically, the first pendant group is derived from the first monomer of Formula I, the second pendant group is independently derived from a reaction of the second monomer of Formula II with a first quaternizing agent to provide a partially quaternized monomer, the third pendant group is derived from a reaction of a polymer product of the monomer of Formula I and the partially quaternized monomer with a second quaternizing agent, and the fourth pendant group, if present, is derived from the third monomer of Formula X.

The polymer may be prepared from reactants further comprising a chain transfer agent. For example, the chain transfer agent can comprise a sulfur atom. In some embodiments, the chain transfer agent comprises a thiol group. The chain transfer agent may have the structure Q—$SR^a$, where Q comprises an alkyl group, an aryl group, an aralkyl group, a reactive silicon-containing group, or combinations thereof, and $R^a$ is selected from a hydrogen atom, an alkyl group, an aryl group, an aralkyl group, and an acyl group. When Q and $R^a$ are each an alkyl group, an aryl group, an aralkyl group, or a reactive silicon-containing group, Q and Ra can be the same or different. When Q or $R^a$ is an alkyl group, Q or $R^a$ may comprise about 1 to about 20 carbon atoms and may comprise at least linear, branched, or cyclic structure. In some embodiments, the alkyl group comprises 1, 2, 3, 4, 5, 6, 7, 8, 9, 10, 11, 12, 13, 14, 15, 16, 17, 18, 19, or 20 carbon atoms. When Q or $R^a$ is an aryl group, Q or $R^a$ may comprise about 4 to about 16 carbon atoms. When Q or $R^a$ is an aralkyl group, Q or $R^a$ may comprise about 4 to about 20 carbon atoms. Typically, $R^a$ is a hydrogen atom, an alkyl group having 1 to 7 carbon atoms, or an acyl group.

In some embodiments, Q comprises a reactive silicon-containing group having the structure of Formula XI —$R^8Si(R^9)_3$ (XI)

where $R^8$ comprises an alkylene group, an arylene group, or both, and each $R^9$ is independently a hydroxy group or a group bonded to the silicon atom via a hydrolyzable bond. In some embodiments, $R^8$ is an alkylene group having from 1 to 6 carbon atoms, and each $R^9$ is independently a hydroxy group, an alkoxy group, an acyl group, an acyloxy group, a halo group, an ether group, or a polyether group. In some embodiments, $R^8$ is an alkylene group having from 2 to 4 carbon atoms, and each $R^9$ is independently a hydroxy group, a methoxy group, or an ethoxy group.

Representative chain transfer agents include octanethiol, decanethiol, dodecanethiol, (3-mercaptopropyl)trimethoxysilane, and (3-mercaptopropyl)triethoxysilane. The polymer can be prepared from an amount (e.g., a weight percentage) of chain transfer agent sufficient to provide a polymer of a desired weight average molecular weight.

The polymer can be prepared from a reaction mixture comprising 0.01 to 90 weight percent of a first monomer of Formula I and 0.01 to 50 weight percent of a second monomer of Formula II (or the reaction product of the monomer of Formula II with one or both of the first quaternizing agent or the second quaternizing agent), based on the total weight of the monomers in the reaction mixture. The polymer can be prepared from a reaction mixture comprising at least 0.1 weight percent, at least 0.5 weight percent, at least 1 weight percent, at least 5 weight percent, at least 10 weight percent, at least 20 weight percent, at least 30 weight percent, at least 40 weight percent, at least 50 weight percent, at least 60 weight percent, at least 70 weight percent, at least 80 weight percent, at least 85 weight percent, at least 87 weight percent, at least 89 weight percent, at least 89.5 weight percent, or at least 89.9 weight percent of a first monomer of Formula I, based on the total weight of the monomers in the reaction mixture. The polymer can be prepared from a reaction mixture comprising 90 weight percent, less than 90 weight percent, less than 89.5 weight percent, less than 89 weight percent, less than 85 weight percent, less than 80 weight percent, less than 70 weight percent, less than 60 weight percent, less than 50 weight percent, less than 40 weight percent, less than 30 weight percent, less than 20 weight percent, less than 15 weight percent, less than 10 weight percent, less than 5 weight percent, less than 1 weight percent, or less than 0.1 weight percent of a first monomer of Formula I, based on the total weight of the monomers in the reaction mixture.

In some embodiments, the polymer is prepared from a reaction mixture comprising at least 0.1 weight percent, at least 0.5 weight percent, at least 1 weight percent, at least 5 weight percent, at least 10 weight percent, at least 15 weight percent, at least 20 weight percent, at least 25 weight percent, at least 30 weight percent, at least 35 weight percent, at least 40 weight percent, at least 45 weight percent, or at least 49 weight percent, at least 49.5 weight percent, or at least 49.9 weight percent of a second monomer of Formula II (or the reaction product of the monomer of Formula II with one or both of the first quaternizing agent or the second quaternizing agent). In some embodiments, the polymer is prepared from a reaction mixture comprising 50 weight percent, less than 50 weight percent, less than 49.9 weight percent, less than 49.5 weight percent, less than 49 weight percent, less than 45 weight percent, less than 40 weight percent, less than 35 weight percent, less than 30 weight percent, less than 25 weight percent, less than 20 weight percent, less than 15 weight percent, less than 10 weight percent, less than 5 weight percent, less than 2 weight percent of a second monomer of Formula II (or the reaction product of the monomer of Formula II with one or both of the first quaternizing agent or the second quaternizing agent).

In some embodiments, the polymer is prepared from a reaction mixture comprising at least 0.1 weight percent, at least 0.5 weight percent, at least 1 weight percent, at least 5 weight percent, at least 10 weight percent, at least 15 weight percent, at least 20 weight percent, at least 25 weight percent, at least 30 weight percent, at least 35 weight percent, at least 40 weight percent, at least 45 weight percent, or at least 49 weight percent, at least 49.5 weight percent, or at least 49.9 weight percent of a third monomer of Formula X. In some embodiments, the polymer is prepared from a reaction mixture comprising 50 weight percent, less than 50 weight percent, less than 49.9 weight percent, less than 49.5 weight percent, less than 49 weight percent, less than 45 weight percent, less than 40 weight percent, less than 35 weight percent, less than 30 weight percent, less than 25 weight percent, less than 20 weight percent, less than 15 weight percent, less than 10 weight percent, less than 5 weight percent, less than 2 weight percent, less than 1 weight percent, less than 0.5 weight percent, less than 0.25 weight percent, less than 0.2 weight percent, or less than 0.1 weight percent of a third monomer of Formula X.

The polymer can be prepared by a polymerization reaction of a reaction mixture comprising a first monomer of Formula I with a second monomer of Formula II (and with a third monomer of Formula X, if present) to form a precursor polymer, and then by reacting the resultant precursor polymer with the first and second quaternizing agents. If the first quaternizing agent is an acid, the acid is typically reacted with the precursor polymer before the second quaternizing agent is reacted. Alternatively, the polymer of the present invention can be prepared by first reacting a second monomer of Formula II with a first quaternizing agent to form an intermediate ammonium product, then polymerizing the intermediate ammonium product with a first monomer of Formula I (and a third monomer of Formula X, if present) to form an intermediate ammonium polymer. The second quaternizing agent can then be reacted with the intermediate ammonium polymer to provide a polymer.

Typically, the polymerization reaction is carried out with the use of a thermal free radical initiator such as a peroxide (e.g., benzoyl peroxide) or an azo compound (e.g., 2,2'-azobisisobutyronitrile). Alternatively, the reaction can be carried out with the use of a photochemical radical initiator system that can include a photochemical initiator, and optionally at least one of a sensitizer, and an electron donor compound.

The polymer comprises ammonium groups. The polymer further comprises an anion. The anion can be inorganic (e.g., chloride) or organic (e.g., acetate). The composition and polymer of the present invention can comprise more than one anion, for example chloride and acetate ions. The anion can be derived from the first and second quaternizing agents, or it can be derived from, for example, an anion exchange reaction wherein an initial anion is exchanged for another anion.

The polymer is typically a linear polymer. The polymer can comprise linear, branched, or cyclic structures, or a combination of any of linear, branched, or cyclic structures. In some embodiments, the polymer is a random polymer.

The polymer can have any weight average molecular weight. In some embodiments, the polymer can have a weight average molecular weight of not greater than 500,000, not greater than 400,000, not greater than 300,000, not greater than 200,000, not greater than 100,000, not greater than 80,000, not greater than 60,000, not greater than 50,000, not greater than 40,000, not greater than 30,000, not greater than 20,000, not greater than 15,000, not greater than 10,000, not greater than 8,000, not greater than 6,000, not greater than 4,000, not greater than 2,000, or not greater than 1,000. In some embodiments, the polymer has a weight average molecular weight of at least 1000, at least 2000, at least 3000, at least 4000, at least 5000, at least 6000, at least 7000, at least 8000, at least 9000, at least 10,000, at least 12,000, at least 15,000, at least 17,000, at least 20,000, at least 25,000, at least 30,000, at least 40,000, at least 50,000, at least 60,000, at least 70,000, at least 80,000, at least 90,000, at least 100,000, at least 200,000, at least 300,000, at least 400,000 or at least 500,000.

In some embodiments, the polymer can be dissolved in a water-soluble organic solvent. Typically, the polymer is prepared in a water-soluble organic solvent. In some embodiments, the polymer can be dispersed in water. In other embodiments, the polymer can be dissolved in water. Typically, the polymer can be dispersed in a mixture of water and a water-soluble organic solvent. In some embodiments, a solution or a dispersion of the polymer in a solvent comprising a water-soluble organic solvent is combined or diluted with water to provide a solution or a dispersion of the polymer in a mixture of the solvent and water.

The composition can comprise at least one water-soluble organic solvent. The composition can comprise less than 10 weight percent to more than 99 weight percent water-soluble organic solvent. The composition can comprise more than 0.1 weight percent, more than 0.5 weight percent, more than 1 weight percent, more than 5 weight percent, more than 10 weight percent, more than 20 weight percent, more than 30 weight percent, more than 40 weight percent, more than 50 weight percent, more than 60 weight percent, more than 70 weight percent, more than 80 weight percent, more than 90 weight percent, or more than 99 weight percent water-soluble organic solvent. The composition can comprise less than 99.9 weight percent, less than 99.5 weight percent, less than 99 weight percent, less than 95 weight percent, less than 90 weight percent, less than 80 weight percent, less than 70 weight percent, less than 60 weight percent, less than 50 weight percent, less than 40 weight percent, less than 30 weight percent, less than 20 weight percent, or less than 10 weight percent water-soluble organic solvent. The composition can be provided as a concentrate in a water-soluble organic solvent.

The water-soluble organic solvent can be soluble in water in all proportions of organic solvent and water. The water-soluble organic solvent can be soluble in water up to 1 weight percent, up to 2 weight percent, up to 5 weight percent, up to 10 weight percent, up to, 20 weight percent, up to 30 weight percent, up to 40 weight percent, up to 50 weight percent, up to 60 weight percent, up to 70 weight percent, up to 80 weight percent, or up to 90 weight percent organic solvent in water. The water-soluble organic solvent can be soluble in water up to more than about 90 weight percent organic solvent in water. Suitable organic solvents include ketones (e.g., acetone), ethers (e.g., dimethoxyethane, tetrahydrofuran), esters (e.g., methyl acetate), carbonates (e.g., propylene carbonate), amides (e.g., dimethylacetamide), sulfoxides (e.g., dimethylsulfoxide), sulfones (e.g., sulfolane), and alcohols (e.g., ethanol, isopropanol, n-propanol, methoxypropanol, dipropyleneglycol monomethyl ether). In some embodiments, the water-soluble organic solvent comprises a solvent used to prepare the polymer. In some embodiments, the water-soluble organic solvent comprises a solvent not used to prepare the polymer, for example a solvent that is added to the composition. In some embodiments, the water-soluble organic solvent can be added to the composition during a processing or formulation step, for example during a solvent exchange process.

The composition can comprise water. Water can be present from less than about 1 to more than about 99 weight percent of the composition. The composition can comprise more than 0.1 weight percent, more than 0.5 weight percent, more than 1 weight percent, more than 5 weight percent, more than 10 weight percent, more than 20 weight percent, more than 30 weight percent, more than 40 weight percent, more than 50 weight percent, more than 60 weight percent, more than 70 weight percent, more than 80 weight percent, more than 90 weight percent, or more than 99 weight percent water. The composition can comprise less than 99.9 weight percent, less than 99.5 weight percent, less than 99 weight percent, less than 95 weight percent, less than 90 weight percent, less than 80 weight percent, less than 70 weight percent, less than 60 weight percent, less than 50 weight percent, less than 40 weight percent, less than 30 weight percent, less than 20 weight percent, less than 10 weight percent, less than 5 weight percent, less than 1 weight percent, less than 0.5 weight percent, or less than 0.1 weight percent water.

The composition can comprise water and a water-soluble organic solvent. The percentage of water (of the total weight of water and a water-soluble organic solvent) can be less than 1 weight percent to more than 99 weight percent. The percentage of water can be more than 1 weight percent, more than 2 weight percent, more than 5 weight percent, more than 10 weight percent, more than 15 weight percent, more than 20 weight percent, more than 30 weight percent, more than 40 weight percent, more than 50 weight percent, more than 60 weight percent, more than 70 weight percent, more than 80 weight percent, more than 90 weight percent, more than 95 weight percent, more than 99 weight percent, more than 99.5 weight percent, more than 99.8 weight percent, or more than 99.9 weight percent of the total weight of water and a water-soluble organic solvent. The percentage of water can be less than 99.9 weight percent, less than 99.8 weight percent, less than 99.5 weight percent, less than 99 weight percent, less than 95 weight percent, less than 90 weight percent, less than 85 weight percent, less than 80 weight percent, less than 75 weight percent, less than 70 weight percent, less than 65 weight percent, less than 60 weight percent, less than 55 weight percent, less than 50 weight percent, less than 45 weight percent, less than 40 weight percent, less than 35 weight percent, less than 30 weight percent, less than 25 weight percent, less than 20 weight percent, less than 15 weight percent, less than 10 weight percent, less than 5 weight percent, less than 2 weight percent, or less than 1 weight percent.

The concentration of the polymer in a mixture of water and a water soluble organic solvent can be more than 1 weight percent, more than 2 weight percent, more than 5 weight percent, more than 10 weight percent, more than 15 weight percent, more than 20 weight percent, more than 30 weight percent, more than 40 weight percent, more than 50 weight percent, more than 60 weight percent, more than 70 weight percent, more than 80 weight percent, or more than 90 weight percent. The concentration of the polymer in a mixture of water and a water soluble organic solvent can be less than 90 weight percent, less than 85 weight percent, less than 80 weight percent, less than 75 weight percent, less than 70 weight percent, less than 65 weight percent, less than 60 weight percent, less than 55 weight percent, less than 50 weight percent, less than 45 weight percent, less than 40 weight percent, less than 35 weight percent, less than 30 weight percent, less than 25 weight percent, less than 20 weight percent, less than 15 weight percent, less than 10 weight percent, less than 5 weight percent, less than 2 weight percent, less than 1 weight percent, less than 0.5 weight percent, less than 0.2 weight percent, or less than 0.1 weight percent.

The compositions can comprise one or more additives. Such additives can include, for example, UV absorbers, inorganic or organic microparticles or nanoparticles, buffering agents, fireproofing agents, antistatic agents, antimicrobial agents (e.g., fungicidal agents), sequestering agents, mineral salts, surfactants, or bleaching agents.

Method and Article

A method of protecting a substrate is provided, the method comprising providing a composition comprising a) a polymer having a first pendant group selected from at least one perfluorinated ether group or perfluoroalkanesulfonamido group, a second pendant group comprising an ammonium group, wherein the second pendant group is free of silicon, and a third pendant group comprising an ammonium group and a reactive silicon-containing group, and b) at least one of a water-soluble organic solvent or water. The method further comprises contacting the substrate with the composition. In some embodiments, the method comprises providing a composition comprising a polymer that further comprises a fourth pendant group comprising a nonionic, non-fluorinated group. In some embodiments, the polymer is substantially free of amino groups. In other embodiments, the polymer is free of amino groups.

The step of contacting can comprise, for example, immersing a substrate in a composition, condensing, spraying, brushing, or rolling the composition on a substrate, or flooding a substrate with a composition. The substrate can include textile, silicate, paper, metal, wood, and plastic. In some embodiments, the substrate can be cotton, viscose, wool, silk, polyester, polyamide, rayon, clay, ceramic, glass, concrete, and combinations thereof. In some embodiments, the method comprises contacting a substrate with a composition comprising a polymer and at least one of a water soluble organic solvent or water.

The substrate can comprise a ceramic. Such ceramic can be in the form of, for example, glazed or unglazed ceramic tile (e.g., kitchen or bathroom tile). The substrate can comprise glass, for example, fiberglass, flint glass or borosilicate glass. The substrate can comprise concrete, including, but not limited to, structural concrete and decorative concrete. In some embodiments, the substrate can be a textile comprising a blend of cotton and polyester or a blend of polyamide and polyester. In some embodiments, the substrate comprises a textile suitable for use in clothing or upholstery.

The composition can be used to protect a substrate, particularly the surface of a substrate, so as to render the substrate oil repellent, water repellent, or both, or to provide stain repellency to such substrates. Protection of a substrate can result in rendering the protected substrate, particularly the surface or protected surface of a protected substrate, more readily cleanable due to the oil and/or water repellent nature of the protected substrate or surface. Typically, a substrate is protected by an amount of a composition sufficient to result in the substrate having a contact angle with distilled water of at least 80° and a contact angle with hexadecane of at least 40°. In some embodiments, the protected substrate can remain protected after the protected substrate is subjected to abrasion or scrubbing.

The method of protecting a surface can comprise combining a composition, particularly a composition comprising a polymer and a water-soluble organic solvent, with water to provide an aqueous mixture. A composition can be combined with water by adding water to the composition or by adding the composition to water. In some embodiments, combining a composition with water comprises diluting a composition (in some embodiments comprising a water-soluble organic solvent) with water. In some embodiments of the method, the step of providing a composition comprises combining the composition with water. Additives such as acids or bases can be added to the aqueous mixture.

In some embodiments, a substrate, or particularly the surface of a substrate, can be cleaned prior to contacting it with the composition. The substrate can be cleaned prior to contacting it with the composition, for example by washing the substrate with water or with an organic solvent.

An article comprising a substrate and a polymer is provided. The polymer is in contact with at least a portion of a surface of the substrate, the polymer comprising a first pendant group selected from at least one perfluorinated ether group or perfluoroalkanesulfonamido group, a second pendant group comprising an ammonium group, wherein the second pendant group is free of silicon, and a third pendant group comprising an ammonium group and a reactive silicon-containing group. In some embodiments, the polymer further comprises a fourth pendant group comprising a nonionic, non-fluorinated group. In some embodiments, the polymer is substantially free of amino groups. In other embodiments, the polymer is free of amino groups. The substrate can include textile, silicate, paper, metal, wood, and plastic. In some embodiments, the substrate can be cotton, viscose, wool, silk, polyester, polyamide, rayon, clay, ceramic, glass, concrete, and combinations thereof.

EXAMPLES

Unless otherwise noted, all reagents and solvents can be obtained from Sigma-Aldrich Co., St. Louis, Mo.

"MeFSBEA" refers to the acrylic acid ester of N-2-hydroxyethyl-N-methylperfluorobutanesulfonamide, prepared essentially as described in WO 01/30873.

"3-CPTES" refers to 3-chloropropyltriethoxysilane.

"DMAEMA" refers to N,N-dimethylaminoethyl methacrylate.

"HSPTES" refers to (3-mercaptopropyl)triethoxysilane.

"MAOPTES" refers to (3-methacryloxypropyl)triethoxysilane.

"AIBN" refers to 2,2'-azobisisobutyronitrile.

"HOAc" refers to acetic acid.

"HFPO acrylate" refers to a perfluoropolyether acrylate, the acrylic acid ester of an alcohol derived from an oligomer of hexafluoropropylene oxide, the oligomer having a weight average molecular weight of approximately 1300, prepared as described in U.S. Pat. No. 6,923,921 (Flynn, et al.).

Example 1

Preparation of a Polymer

A 500 mL 3-neck flask, fitted with a mechanical stirrer, a heating mantle, a reflux condenser, and a thermometer, was charged with MeFBSEA (49.3 g), DMAEMA (13.3 g), HSPTES (4 g), isopropanol (73 g), and AIBN (0.15 g). The mixture was degassed by three cycles of partially evacuating the flask and refilling it with nitrogen gas. The mixture was stirred under a nitrogen atmosphere and was heated to approximately 70° C. After approximately 6 hours, an additional 0.05 g of AIBN was added. The mixture was stirred at approximately 70° C. overnight, after which time 3-chloropropyltrimethoxysilane (21.6 g) was added to the flask. The temperature was increased to approximately 80° C. and the mixture was stirred for an additional approximately 16 hours.

The mixture was allowed to cool to room temperature to afford the product as an approximately 50 weight percent solution of a polymer in isopropanol.

Example 2

Preparation of a Polymer

A 500 mL 3-neck flask, fitted with a mechanical stirrer, a heating mantle, a reflux condenser, and a thermometer was charged with MeFBSEA (49.3 g), DMAEMA (13.0 g), octanethiol (2.9 g), isopropanol (73 g), and AIBN (0.15 g). The mixture was degassed by three cycles of partially evacuating the flask and refilling it with nitrogen gas. The mixture was stirred under a nitrogen atmosphere and was heated to approximately 70° C. After approximately 6 hours, an additional 0.05 g of AIBN was added. The mixture was stirred at approximately 70° C. overnight, after which time 3-CPTES (20.5 g) was added to the flask. The temperature was increased to approximately 80° C. and the mixture was stirred for an additional approximately 16 hours. The mixture was allowed to cool to room temperature to afford the product as an approximately 50 weight percent solution of a polymer in isopropanol.

Example 3

Preparation of a Polymer

A 500 mL 3-neck flask, fitted with a mechanical stirrer, a heating mantle, a reflux condenser, and a thermometer was charged with MeFBSEA (49.3 g), DMAEMA (7.9 g), HSPTES (4 g), isopropanol (73 g), and AIBN (0.15 g). The mixture was degassed by three cycles of partially evacuating the flask and refilling it with nitrogen gas. The mixture was stirred under a nitrogen atmosphere and was heated to approximately 70° C. After approximately 6 hours, an additional 0.05 g of AIBN was added. The mixture was stirred at approximately 70° C. overnight, after which time 3-CPTES (12.5 g) was added to the flask. The temperature was increased to approximately 80° C. and the mixture was stirred for an additional approximately 16 hours. The mixture was allowed to cool to room temperature to afford the product as an approximately 50 weight percent solution of a polymer in isopropanol.

Examples 4-9

Preparation of Polymer

The polymer solutions of Examples 4-9 were prepared according to the procedure essentially as described in Example 3. The compositions are given in Table 1.

TABLE 1

Composition of Polymers of Examples 4-9.

| Example | Wt. MeFBSEA | Wt. DMAEMA | Wt. HSPTES | Wt. 3-CPTES |
|---|---|---|---|---|
| 4 | 49.3 g | 10.7 g | 4.0 g | 16.8 g |
| 5 | 49.3 g | 13.3 g | 4.0 g | 20.9 g |
| 6 | 49.3 g | 16.0 g | 4.0 g | 25.1 g |
| 7 | 49.3 g | 26.6 g | 5.9 g | 41.8 g |
| 8 | 49.3 g | 13.8 g | 4.0 g | 17.2 g |
| 9 | 49.3 g | 5.3 g | 4.0 g | 8.4 g |

Example 10

Preparation of a Polymer

A 500 mL 3-neck flask, fitted with a mechanical stirrer, a heating mantle, a reflux condenser, and a thermometer was charged with DMAEMA (10.7 g) and formic acid (0.8 g). To the stirring mixture there was added MeFBSEA (49.3 g), HSPTES (4 g), isopropanol (73 g), and AIBN (0.15 g). The mixture was degassed by three cycles of partially evacuating the flask and refilling it with nitrogen gas. The mixture was stirred under a nitrogen atmosphere and was heated to approximately 70° C. After approximately 6 hours, 0.05 g of AIBN was added. The mixture was stirred at approximately 70° C. overnight, after which time 3-CPTES (12.6 g) was added to the flask. The temperature was increased to approximately 80° C. and the mixture was stirred for an additional approximately 16 hours. The mixture was allowed to cool to room temperature to afford the product as an approximately 50 weight percent solution of a polymer in isopropanol.

Example 11

Preparation of a Polymer

The polymer solutions of Example 11 was prepared according to the procedure essentially as described in Example 10, except that acetic acid (1.1 g) was used in place of formic acid, and 11.4 g of DMAEMA, 5.9 g of HSPTES, and 13.0 g of 3-CPTES were added to the flask.

Examples 12-18

Preparation of Polymer

The polymer solutions of Examples 12-18 were prepared according to the procedure essentially as described in Example 11. The compositions are given in Table 2.

TABLE 2

Composition of Polymers of Examples 12-18.

| Example | Wt. MeFBSEA | Wt. DMAEMA | Wt. HOAc | Wt. HSPTES | Wt. 3-CPTES |
|---|---|---|---|---|---|
| 12 | 49.3 g | 11.4 g | 3.2 g | 5.9 g | 4.3 g |
| 13 | 49.3 g | 10.7 g | 1.0 g | 4.0 g | 12.6 g |
| 14 | 49.3 g | 7.9 g | 1.0 g | 4.0 g | 8.2 g |
| 15 | 49.3 g | 10.7 g | 3.2 g | 4.0 g | 4.2 g |
| 16 | 49.3 g | 10.7 g | 2.1 g | 4.0 g | 8.4 g |
| 17 | 49.3 g | 10.7 g | 0.9 g | 4.0 g | 10.9 g |
| 18 | 49.3 g | 11.0 g | 1.1 g | 4.0 g | 13.0 g |

Example 19

Preparation of a Polymer

A 500 mL 3-neck flask, fitted with a mechanical stirrer, a heating mantle, a reflux condenser, and a thermometer was charged with DMAEMA (14.4 g) and acetic acid (4.3 g). To the stirring mixture there was added HFPO acrylate (70.8 g), HSPTES (1.0 g), isopropanol (73 g), and AIBN (0.15 g). The mixture was degassed by three cycles of partially evacuating the flask and refilling it with nitrogen gas. The mixture was stirred under a nitrogen atmosphere and was heated to approximately 70° C. After approximately 6 hours, an additional 0.05 g of AIBN was added. The mixture was stirred at approximately 70° C. overnight, after which time 3-CPTES (5.6 g) was added to the flask. The temperature was increased to approximately 80° C. and the mixture was stirred for an additional approximately 16 hours. The mixture was allowed to cool to room temperature to afford the product as an approximately 50 weight percent solution of a polymer in isopropanol.

Examples 20-36

Protection of Ceramic Tile

Each product of Examples 1-8, 10, 11, and 13-19 (0.1 g each) was added, with stirring, to deionized water (98.9 g) to provide aqueous mixtures as dispersions or solutions. A 37 weight percent aqueous solution of HCl (1 g) was then added to each mixture to provide an aqueous spray mixture. White glazed ceramic tiles (available from Villeroy & Boch AG, Mettlach, Germany) were heated to approximately 100° C., and the glazed sides of separate tiles were sprayed with each aqueous spray mixture. The spray rate was approximately 40 mL of aqueous spray mixture per minute. Each tile was sprayed for approximately 30 seconds. The sprayed tiles were allowed to dry for approximately 24 hours. A portion the sprayed area of each tile was scrubbed, using an Erichsen cleaning machine (obtained from DCI, Belgium) and a cleanser available under the trade designation CIF CREAM (Unilever PLC, London, United Kingdom), for 40 cycles to provide tiles with unscrubbed and scrubbed portions. The static contact angle of each of water and hexadecane in the unscrubbed and scrubbed portions of each tile was measured using a Model DSA100 contact angle measuring system (Kruss GmbH, Hamburg, Germany). The data are given in Table 3.

TABLE 3

Ceramic Tile Contact Angle Data

| Example | Composition | Contact angle (unscrubbed) | | Contact angle (scrubbed) | |
|---|---|---|---|---|---|
| | | Water | Hexadecane | Water | Hexadecane |
| 20 | Example 3 | 98° | 61° | 68° | 46° |
| 21 | Example 4 | 103° | 67° | 70° | 45° |
| 22 | Example 5 | 104° | 64° | 65° | 47° |
| 23 | Example 6 | 107° | 67° | 68° | 48° |
| 24 | Example 7 | 92° | 58° | 62° | 41° |
| 25 | Example 1 | 102° | 66° | 65° | 45° |
| 26 | Example 8 | 100° | 64° | 69° | 42° |
| 27 | Example 2 | 108° | 67° | 70° | 48° |
| 28 | Example 11 | 99° | 64° | 64° | 46° |
| 29 | Example 13 | 97° | 63° | 62° | 44° |
| 30 | Example 14 | 100° | 65° | 66° | 46° |
| 31 | Example 15 | 97° | 62° | 67° | 47° |
| 32 | Example 16 | 103° | 64° | 66° | 43° |
| 33 | Example 10 | 95° | 66° | 65° | 48° |
| 34 | Example 17 | 98° | 68° | 67° | 45° |
| 35 | Example 19 | 108° | 70° | 63° | 49° |
| 36 | Example 18 | 105° | 60° | 66° | 42° |

Examples 37-46

Protection of Glass

Each product of Examples 1, 3, 5, 6, 8, 11, 13, 15, 16, and 19 (0.1 g each) was added, with stirring, to deionized water (98.9 g) to provide aqueous mixtures as dispersions or solutions. A 37 weight percent aqueous solution of HCl (1 g) was then added to each mixture to provide an aqueous spray mixture. Samples of window glass (10 cm×15 cm) were sprayed with each aqueous spray mixture. The spray rate was approximately 40 mL of aqueous spray mixture per minute. Each sample of glass was sprayed for approximately 30 seconds. The sprayed glass samples were allowed to dry for approximately 24 hours. A portion the sprayed area of each glass sample was scrubbed, using an Erichsen cleaning machine (obtained from DCI, Belgium) and a sponge wet with deionized water, for 4000 cycles to provide glass samples with unscrubbed and scrubbed portions. The static contact angle of each of water and hexadecane in the unscrubbed and scrubbed portions of each glass sample was measured using a Model DSA100 contact angle measuring system (Kruss GmbH, Hamburg, Germany). The data are given in Table 4.

TABLE 4

Glass Contact Angle Data

| Example | Composition | Contact angle (unscrubbed) | | Contact angle (scrubbed) | |
|---|---|---|---|---|---|
| | | Water | Hexadecane | Water | Hexadecane |
| 37 | Example 3 | 99° | 69° | 95° | 60° |
| 38 | Example 5 | 95° | 62° | 88° | 56° |
| 39 | Example 6 | 103° | 64° | 100° | 59° |
| 40 | Example 1 | 100° | 63° | 92° | 55° |
| 41 | Example 8 | 96° | 66° | 89° | 55° |
| 42 | Example 11 | 102° | 62° | 99° | 48° |
| 43 | Example 13 | 95° | 65° | 81° | 48° |
| 44 | Example 15 | 99° | 66° | 95° | 54° |
| 45 | Example 16 | 100° | 63° | 90° | 54° |
| 46 | Example 19 | 102° | 61° | 93° | 60° |

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A polymer prepared from reactants comprising:
   a) a first monomer having the structure of Formula I

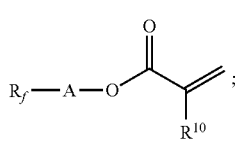

(I)

b) a second monomer having the structure of Formula II

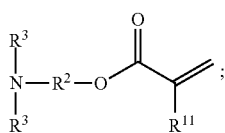

(II)

c) a first quaternizing agent comprising at least one of an acid or a silicon-free alkylating agent; and d) a second quaternizing agent comprising the structure of Formula III $$X\text{—}R^6\text{—}Si(R^7)_3, \quad (III)$$

wherein:
$R_f$ is selected from a structure of Formula IV or Formula V $$F(C_mF_{2m}O)_nC_pF_{2p}\text{—} \quad (IV)$$

$$C_xF_{2x+1}SO_2N(R^1)\text{—}, \quad (V)$$

m is an integer of 1 to 12;
n is an integer of 1 to 40;
p is an integer of 1 to 6;
x is an integer of 1 to 6;
$R^1$ is a hydrogen atom, an alkyl group, an aryl group, or an aralkyl group, and combinations thereof;
A is a linking group having less than 11 carbon atoms;
$R^{10}$ is a hydrogen atom or an alkyl group having 1 to 4 carbon atoms;
$R^2$ comprises at least one of an alkylene group, a heteroalkylene group, an arylene group, or an aralkylene group;
each $R^3$ is independently a hydrogen atom or an alkyl group;
$R^{11}$ is a hydrogen atom or an alkyl group having 1 to 4 carbon atoms;
X is a leaving group selected from the group consisting of halo, alkyl sulfonate, fluorinated alkyl sulfonate, aryl sulfonate, and fluorinated aryl sulfonate;
$R^6$ comprises an alkylene, an arylene group, or an aralkylene group; and
each $R^7$ is independently selected from the group consisting of hydroxy groups, alkoxy groups, acyl groups, acyloxy groups, halo groups, polyether groups, and combinations thereof.

2. A polymer prepared from reactants comprising:
a) a first monomer having the structure of Formula I

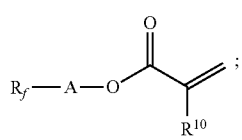

b) a second monomer having the structure of Formula II

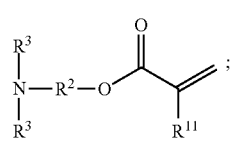

c) a first quaternizing agent comprising at least one of an acid or a silicon-free alkylating agent; and
d) a second quaternizing agent comprising the structure of Formula III $$X\text{—}R^6\text{—}Si(R^7)_3, \quad (III)$$

wherein:
$R_f$ is selected from a structure of Formula IV or Formula V $$F(C_mF_{2m}O)_nC_pF_{2p}\text{—} \quad (IV)$$

$$C_xF_{2x+1}SO_2N(R^1)\text{—}, \quad (V)$$

m is an integer of 1 to 12;
n is an integer of 1 to 40;
p is an integer of 1 to 6;
x is an integer of 1 to 6;
$R^1$ is a hydrogen atom, an alkyl group, an aryl group, or an aralkyl group, and combinations thereof;
A is a linking group having less than 11 carbon atoms;
$R^{10}$ is a hydrogen atom or an alkyl group having 1 to 4 carbon atoms;
$R^2$ comprises at least one of an alkylene group, a heteroalkylene group, an arylene group, or an aralkylene group;
each $R^3$ is independently a hydrogen atom or an alkyl group;
$R^{11}$ is a hydrogen atom or an alkyl group having 1 to 4 carbon atoms;
X is a leaving group selected from the group consisting of halo, alkyl sulfonate, fluorinated alkyl sulfonate, aryl sulfonate, and fluorinated aryl sulfonate;
$R^6$ comprises an alkylene, an arylene group, or an aralkylene group; and
each $R^7$ is independently selected from the group consisting of hydroxy groups, alkoxy groups, acyl groups, acyloxy groups, halo groups, polyether groups, and combinations thereof;
wherein the polymer is substantially free of amino groups.

3. The polymer of claim 1 prepared from reactants further comprising a third monomer of Formula X:

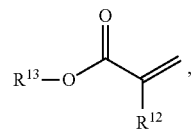

wherein $R^{12}$ is a hydrogen atom or an alkyl group having 1 to 4 carbon atoms, and $R^{13}$ is a nonionic, non-fluorinated group.

4. The polymer of claim 1 prepared from reactants further comprising a chain transfer agent.

5. The polymer of claim 4 wherein the chain transfer agent has the structure Q—SR$^a$, wherein Q comprises at least one of an alkyl group, an aryl group, an aralkyl group, or a reactive silicon-containing group, and R$^a$ is selected from a hydrogen atom, an alkyl group, an aryl group, an aralkyl group, and an acyl group.

6. The polymer of claim 5 wherein Q comprises the structure of Formula XI $$\text{—}R^8Si(R^9)_3, \quad (XI)$$

wherein $R^8$ comprises an alkylene group, an arylene group, or both, and each $R^9$ is independently selected from the group consisting of hydroxy groups, alkoxy groups, acyl groups, acyloxy groups, halo groups, polyether groups, and combinations thereof.

* * * * *

UNITED STATES PATENT AND TRADEMARK OFFICE
CERTIFICATE OF CORRECTION

| | | |
|---|---|---|
| PATENT NO. | : 8,669,319 B2 | Page 1 of 1 |
| APPLICATION NO. | : 13/709951 | |
| DATED | : March 11, 2014 | |
| INVENTOR(S) | : Rudolf Dams | |

It is certified that error appears in the above-identified patent and that said Letters Patent is hereby corrected as shown below:

In the Specification

Column 6
Line 61, Delete "cyclopenyl," and insert -- cyclopentyl, --, therefor.

Column 8
Lines 6-7, Delete "cyclhexylene," and insert -- cyclohexylamine, --, therefor.

Column 8
Line 65, Delete "X—$R^6Si(R^7)_3$" and insert -- X—$R^6$—$Si(R^7)_3$ --, therefor.

Column 10
Line 53, Delete "Ra" and insert -- $R^a$ --, therefor.

Column 12
Line 48, Delete "aceate)." and insert -- acetate). --, therefor.

Signed and Sealed this
Fourteenth Day of October, 2014

Michelle K. Lee
*Deputy Director of the United States Patent and Trademark Office*